Nov. 24, 1959  C. W. MERTZ  2,914,589
CONTROL OF OXYGEN CONTENT OF LOW BOILING HYDROCARBONS
Filed July 20, 1955
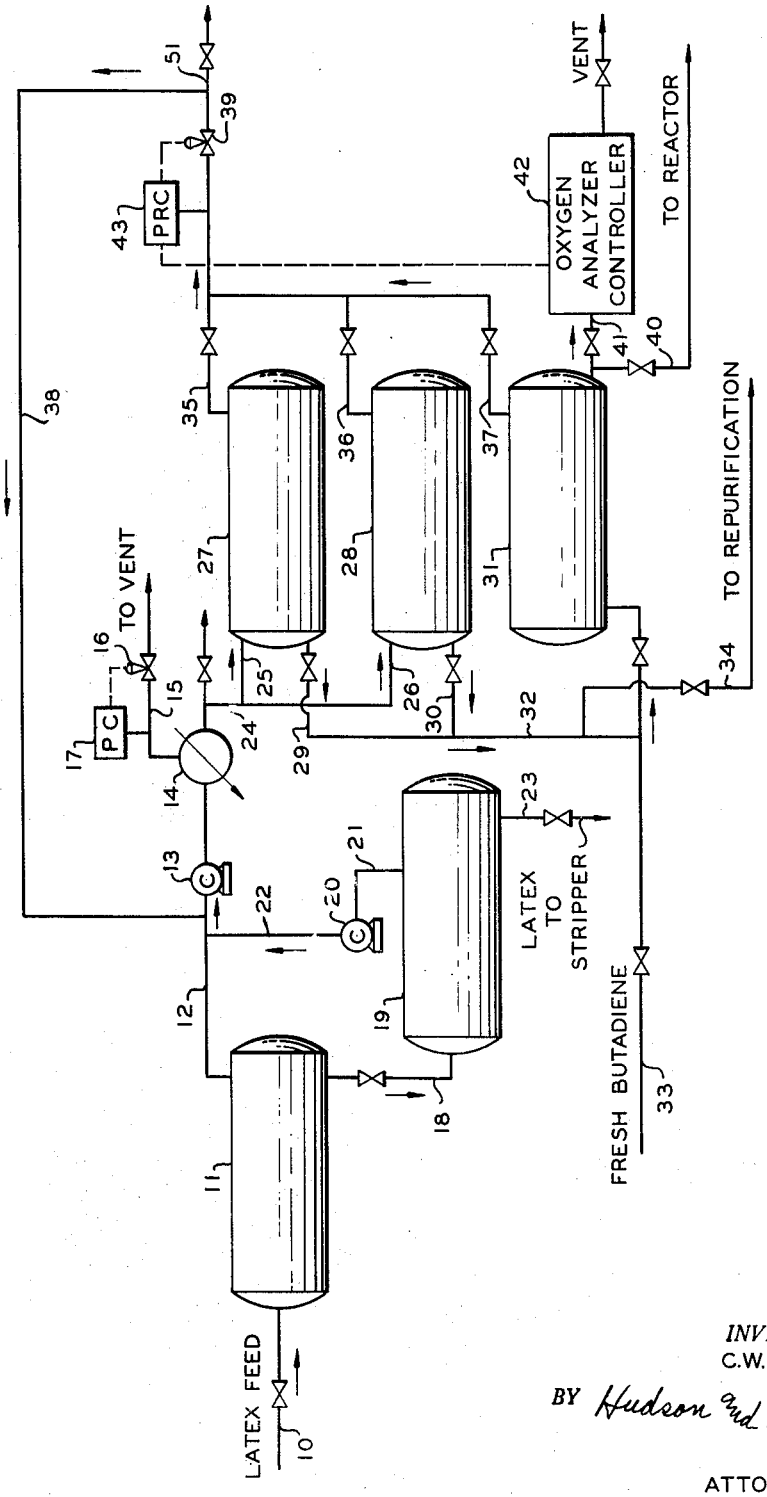
INVENTOR.
C.W. MERTZ
BY Hudson and Young
ATTORNEYS

United States Patent Office 2,914,589
Patented Nov. 24, 1959

2,914,589
CONTROL OF OXYGEN CONTENT OF LOW BOILING HYDROCARBONS

Clyde W. Mertz, Bartlesville, Okla., assignor to Phillips Petroleum Company, a corporation of Delaware Application July 20, 1955, Serial No. 523,141

4 Claims. (Cl. 260—681.5)

This invention relates to the removal of oxygen, and other noncondensable gases, from low boiling hydrocarbons. In one of its more specific aspects this invention relates to an improved method for controlling the oxygen content of butadiene.

In the copolymerization of butadiene and styrene to produce a synthetic elastomer, commonly called GR-S synthetic rubber, unreacted butadiene and styrene are usually present in the latex resulting from the copolymerization process. This condition obtains when the conventional high temperature copolymerization process is employed and also in the more recent cold rubber copolymerization process. When either of these processes is employed for the production of synthetic rubber the butadiene and styrene, which remain unconverted in the copolymerization reaction, are recovered from the reaction mixture, usually by vacuum recovery. It is well known that it is very difficult to exclude all traces of atmospheric oxygen and nitrogen from vacuum processes and this is true in the operation for the recovery of butadiene and styrene from a synthetic latex. The butadiene recovered in this operation contains oxygen as an impurity and also contains nitrogen since the oxygen impurity is derived from the atmosphere.

It is known that oxygen dissolved in butadiene and/or styrene markedly affects the rate of copolymerization of these materials. It is also known that varying concentrations of dissolved oxygen in butadiene and/or styrene causes the rate of copolymerization to vary. Thus, it is difficult to determine whether a charge of butadiene and styrene will copolymerize at the desired and normally expected rate or will copolymerize more rapidly or more slowly than the desired rate. When rates of reaction vary it is difficult to control the temperature of the reaction. The copolymerization reaction is exothermic and too rapid a rate of reaction tends to increase the temperature of the reactants. In the production of cold rubber it is very important to maintain the temperature of the copolymerization reaction within relatively narrow limits.

In vacuum recovered unreacted butadiene concentrations of oxygen as great as 100 or more parts per million are frequently found. When these reactants, as recovered and containing such a high concentration of dissolved oxygen, are blended with newly produced butadiene containing substantially no dissolved oxygen the mixture usually contains too great a concentartion of oxygen for proper plant control of the copolymerization reaction. Thus, it is highly advantageous to maintain the recovered butadiene with as low an oxygen content as possible.

Various methods for maintaining a low concentration of dissolved oxygen in recovered butadiene have been proposed. These methods, however, have not been entirely successful and the problem of oxygen contamination of butadiene has persisted. The nitrogen which enters the system with the oxygen is inert so far as the polymerization is concerned but the presence of nitrogen causes excess pressure in the butadiene vessels and should be removed at substantially the rate at which it enters so as to prevent a problem of pressure build-up. Methods of oxygen removal by selective sorption do not remove nitrogen.

I have discovered an improved method for maintaining a consistently low concentration of oxygen in the butadiene to be used in the copolymerization process for the manufacture of synthetic rubber. Broadly speaking, this process comprises the steps of withdrawing vapor from the butadiene storage tank wherein fresh butadiene and recycled butadiene are blended; continuously sampling said butadiene storage and determining the dissolved oxygen content thereof; and controlling the amount of vapor withdrawn from said storage tank in accordance with the dissolved oxygen content of the butadiene of said storage tanks. The vapor stream which is vented from the butadiene storage tanks can be disposed of as in a flare or can be separately processed to recover butadiene if so desired. Nitrogen is removed along with the oxygen by this method. In a preferred system the vapors removed from the butadiene storage tanks are compressed and cooled so as to condense butadiene as a liquid, the vapor is vented from the liquid butadiene and the liquid butadiene is returned to the butadiene storage tanks.

It would be desirable to remove all of the oxygen from the butadiene feed to the polymerization reaction, however, this is usually not economically feasible. It has been found that the polymerization reaction can be accomplished satisfactorily if the oxygen content is maintained substantially constant and as low as is practical from an economic standpoint. I have found that the oxygen content of the butadiene to the reactor can be maintained at a substantially constant value in the range of 3 to 25 p.p.m. by the process of this invention.

It is therefore an object of this invention to provide an improved method for removing oxygen and nitrogen from low boiling hydrocarbons.

It is another object to provide an improved method for recovering unreacted butadiene, having a low oxygen content from a polymerization reaction.

Still another object of my invention is the provision of a process for removing oxygen from light hydrocarbons without the consumption of chemicals.

It is still another object of my invention to provide a process of removing oxygen from light hydrocarbons which is continuous and automatic.

Other objects and advantages will be apparent to one skilled in the art upon studying the following disclosure, including the attached drawing wherein a preferred embodiment of my invention is illustrated.

Referring now to the drawing, reference numeral 10 identifies a pipe through which latex flows from the polymerization reactor to a flash tank 11. Vapors are removed from flash tank 11 through line 12 by means of pump 13 and are passed to condenser 14 wherein the vapors are cooled and partially condensed. The uncondensed vapors are removed from condenser 14 through line 15 and are passed to a butadiene recovery system or can be vented to a flare or to the atmosphere.

The flow of vapors through line 15 is controlled by valve 16 which in turn is controlled by pressure controller 17. Latex is removed from flash tank 11 through line 18 and is passed to a second flask tank 19 maintained at subatmospheric pressure by means of vacuum pump 20 withdrawing vapors from flash tank 19 through line 21 and delivering the vapors through lines 22 and 12 to pump 13. Butadiene-free latex is withdrawn from flash tank 19 through line 23 and passed to a stripping operation (not shown) for removal of styrene.

The liquid butadiene which is collected in condenser 14 is passed through lines 24, 25 and 26 to storage tanks 27 and 28. Liquid butadiene is withdrawn from storage tanks 27 and 28 through lines 29 and 30 and is passed to blending tank 31 through line 32. Fresh butadiene is admitted to blending tank 31 through line 33. A portion of the liquid butadiene drawn from storage tanks 27 and 28 is passed through line 34 to repurification for removal of impurities such as $C_4$ hydrocarbons which otherwise would tend to accumulate in the system. Vapors are removed from tanks 27, 28 and 31 through lines 35, 36 and 37 and are passed to pump 13 through line 38. The flow of vapors through line 38 is controlled by pressure control valve 39. If desired, vapors can be vented through line 51.

Liquid butadiene is withdrawn from blending tank 31 and passed through line 40 to the polymerization reactor (not shown). A portion of the liquid butadiene withdrawn from blending tank 31 is passed through line 41 to an oxygen analyzer controller 42. Pressure control valve 39 is controlled by oxygen analyzer controller 42 acting through pressure controller 43. If desired, the oxygen analyzer controller can be employed to control valve 39 directly.

Conventional auxiliary apparatus such as temperature indicating devices, recording and controlling equipment, many valves, motors and the like, are not illustrated in the drawing nor specifically disclosed for simplicity of presentation. The need for such apparatus, their installation and operation are well understood by those skilled in the art.

As an illustration of the operation of my invention the following example is presented, however, it is not intended that the example should be construed as limiting the invention.

EXAMPLE

In a representative process for the copolymerization of butadiene and styrene 60 percent of the butadiene fed to the reactor is polymerized. The following table presents a material balance in such process operated according to the invention.

Table I

| Numbers on Drawing | Butadiene, Mols | Butadiene Impurities, Mols | Oxygen | |
| --- | --- | --- | --- | --- |
| | | | Mols | P.p.m. (by weight) |
| 33 (Fresh Butadiene) | 98 | 2 | | 5 |
| 40 (To Reactor) | 148 | 13 | 0.0015 | |
| 38 (Vapor Recycle) | 1.9 | 0.4 | 0.0142 | 3,200 |
| 24 (To Storage) | 60.9 | 13.4 | 0.0160 | 120 |
| 32 (From Storage) | 59 | 13 | 0.0018 | 15 |
| 34 | 9 | 2 | 0.0003 | 15 |

The butadiene impurities comprise butenes, and butanes and other materials having a boiling range near that of butadiene which tend to build up in the system if not continuously removed.

The operating conditions in the process as tabulated in Table I are as follows:

The pressure in flash tank 11 is maintained at about 17 p.s.i.a. at 110° F., the pressure in flash tank 19 is maintained at about 150 mm. of mercury at 100° F., the pressure in condenser 14 is maintained at about 65 p.s.i.a. at 90° F. and the pressure in tanks 27, 28 and 31 is maintained at about 55 p.s.i.a. at 90° F.

In operation the oxygen analyzer 42 operates to set the pressure controller as indicated by the oxygen content of the liquid in blending tank 31. Thus, if the dissolved oxygen content of the liquid increases over the predetermined amount the analyzer causes the controller to set at a lower pressure so as to pass more vapor to compressor pump 13. Various types of pressure controller instruments are available and need not be further described here.

As hereinbefore stated the oxygen analyzer controller can be utilized to control, directly, the motor valve 39 in the vapor line instead of operating through a pressure controller instrument.

It will be understood by those skilled in the art that the flash tanks 11 and 19 will be operated under conditions of temperature and pressure favorable to the vaporization of butadiene so as to remove the butadiene as completely as possible from the latex. It is apparent, however, that the temperature should not be sufficiently high or the pressure sufficiently low to vaporize styrene present in the latex in these flash tanks.

Vapors can be selectively withdrawn from any or all of tanks 27, 28 and 31, thus providing increased flexibility in the control of dissolved oxygen in blending tank 31. The vapors withdrawn from the tanks can be recycled to compressor 13 through line 38 or can be vented through line 51. As an added feature of flexibility in the operation of the system of this invention the oxygen content of line 24 can be determined by an analyzer such as analyzer controller 42 and this controller can be utilized to reset pressure controller 17 so as to vent more vapors through valve 16 when the oxygen content of the liquid in line 24 reaches a predetermined maximum value so as to reduce the amount of vapors recycled through line 38 and thus to relieve the load on compressor 13 when an increase in oxygen content of the liquid in line 24 occurs.

The pressure maintained on condenser 14 and storage tanks 27 and 28 and blending tank 31 will be maintained at a value greater than the vapor pressure of butadiene at the temperature existing in these vessels. The pressure maintained on condenser 14 is preferably about 10 to 20 p.s.i. greater than the vapor pressure of butadiene at the existing temperature. The pressure maintained on storage tanks 27 and 28 and blending tank 31 is preferably about 2 to 10 p.s.i. greater than the vapor pressure of butadiene at the existing temperature.

The preferred system of this invention provides means for recycling a controlled amount of butadiene vapors from the butadiene storage tanks to the compression and oxygen eliminating operation of the butadiene recovery system. The exact amount of butadiene vapor recycle required to maintain a predetermined amount of oxygen in the butadiene is governed by the oxygen analyzer-controller. Oxygen analyzer-controllers are well known and a preferred oxygen analyzer controller suitable for this purpose is described in my copending application Serial No. 455,612, filed September 13, 1954. Control of the butadiene vapor recycle by means of the process of this invention effectively avoids overloading of butadiene compressors with needlessly large amounts of recycle butadiene. The preferred process of this invention also minimizes losses of butadiene by recycling only the exact amount required for oxygen removal. The process of this invention provides improved polymerization control in the polymerization reactors because the butadiene supplied to the polymerization reactors contains a substantially constant amount of oxygen.

Although I have described the operation of my improved oxygen removal process as applied to the purification of butadiene, the process is equally applicable for the removal of noncondensable gases from any low boiling hydrocarbon such as ethylene, propane, butane, butenes, pentanes, pentenes, pentadiene, isoprene, chloroprene, and so forth.

Reasonable variations and modifications are possible within the scope of the disclosure of the present invention, the essence of which is an improvement in the process for removing oxygen and nitrogen from low boiling hydrocarbons, such as butadiene, by utilizing an oxygen analyzer to control the amount of hydrocarbon vapor drawn from the storage tank and/or blending tank for venting or for recycle to the compression and venting operations in such process, according to the amount of oxygen existing in the tanks.

That which is claimed is:

1. A system for removal of noncondensable gases from solution in a low-boiling hydrocarbon so as to produce a low-boiling hydrocarbon having no more than a predetermined amount of noncondensable gases dissolved therein comprising a phase separation vessel; means for compressing a vapor stream to a pressure higher than that maintained in said phase separation vessel; means for cooling said compressed vapor stream so as to produce a liquid phase and a vapor phase; means for passing liquid hydrocarbon from said cooling means to said phase separation vessel; means for removing vapor from said phase separation vessel and passing said vapor to said compressing means; means for analyzing liquid hydrocarbon in said phase separation vessel for noncondensable gas content; means responsive to said analyzer means to adjust the rate of removing vapor from said phase separation vessel so as to maintain the noncondensable gas content of said liquid hydrocarbon in said phase separation vessel at substantially a predetermined value; means for removing liquid hydrocarbon from said phase separation vessel; and means for removing noncondensable gases from the system.

2. The system of claim 1 wherein the analyzing means is an oxygen analyzer adapted to determine the oxygen content of butadiene; and the means responsive to said analyzer means is a pressure controller operatively connected to a valve in the means for removing vapor from said phase separation vessel.

3. A process for supplying a stream of butadiene having a substantially constant oxygen content in the range of about 3 to about 25 parts per million to a polymerization reaction for the preparation of GR-S synthetic rubber which comprises evaporating butadiene from the resulting rubber latex at subatmospheric pressure; compressing and cooling the evaporated butadiene to form liquid butadiene; passing the liquefied butadiene to a storage zone maintained at a pressure greater than the vapor pressure of butadiene and about 10 to about 20 p.s.i. lower than that of said compressing step so as to form a liquid phase and a vapor phase; adding fresh butadiene from a supply to said storage zone; passing a stream of liquid butadiene from said storage zone to an analyzing zone where a signal is generated representative of the amount of oxygen in the butadiene; withdrawing vapor from said storage and passing same to said compressing step in an amount sufficient to maintain the oxygen content of the butadiene in said storage zone at a substantially constant value in the range of about 3 to about 25 parts per million as indicated by the signal generated in said analyzing zone; and removing from the system oxygen separated from the butadiene.

4. A process for supplying a stream of butadiene having a substantially constant oxygen content in the range of about 3 to about 25 parts per million to a polymerization reaction for the preparation of synthetic rubber which comprises evaporating butadiene from the resulting rubber latex at subatmospheric pressure; compressing and cooling the evaporated butadiene to form liquid butadiene; passing the liquefied butadiene to a storage zone maintained at a pressure greater than the vapor pressure of butadiene and about 10 to about 20 p.s.i. lower than that of said compressing step so as to form a liquid phase and a vapor phase; adding fresh butadiene from a supply to said storage zone; passing a stream of liquid butadiene from said storage zone to an analyzing zone where a signal is generated representative of the amount of oxygen in the butadiene; withdrawing vapor from said storage and passing same to said compressing step in an amount sufficient to maintain the oxygen content of the butadiene in said storage zone at a substantially constant value in the range of about 3 to about 25 parts per million as indicated by the signal generated in said analyzing zone; and removing from the system oxygen separated from the butadiene.

References Cited in the file of this patent

UNITED STATES PATENTS

| | | |
|---|---|---|
| 2,351,167 | Ware | June 13, 1944 |
| 2,389,244 | Whaley | Nov. 20, 1945 |
| 2,572,527 | Sebald | Oct. 23, 1951 |
| 2,792,501 | Barton | May 14, 1957 |